Dec. 28, 1948. S. S. LIPPINCOTT 2,457,694
SPIRAL WOUND GASKET
Filed Dec. 10, 1946
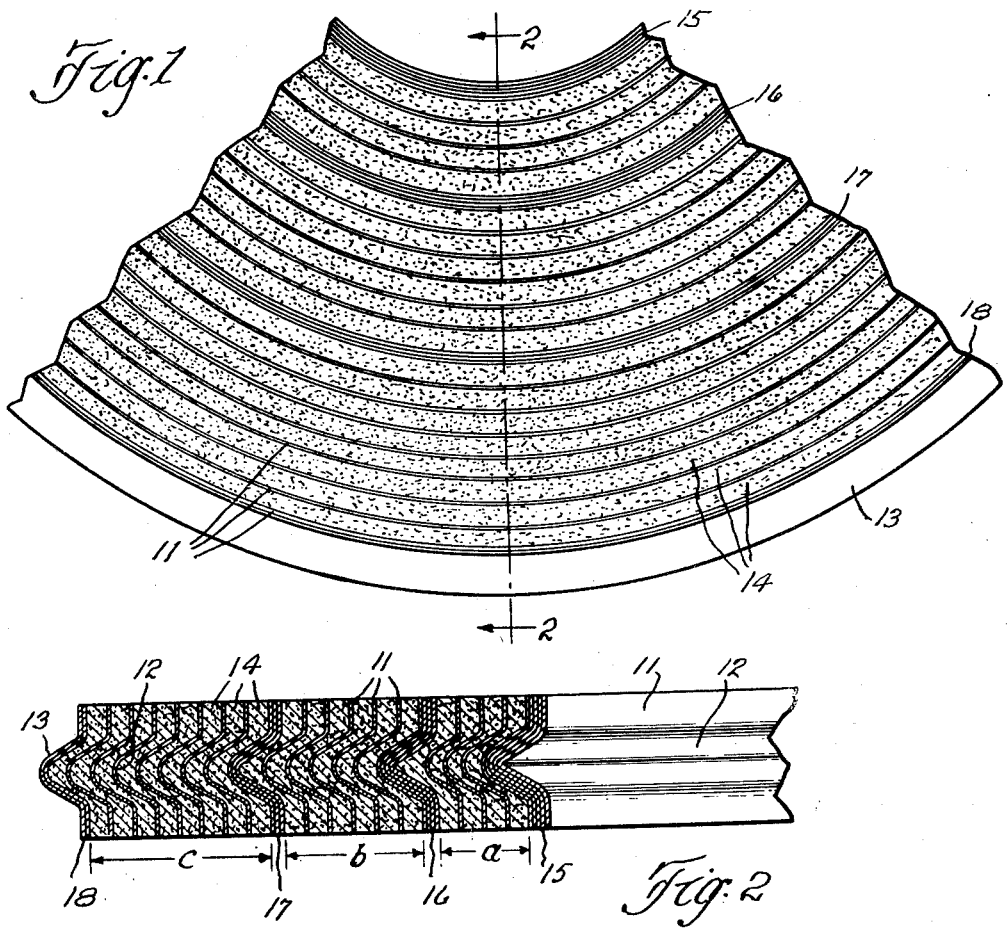
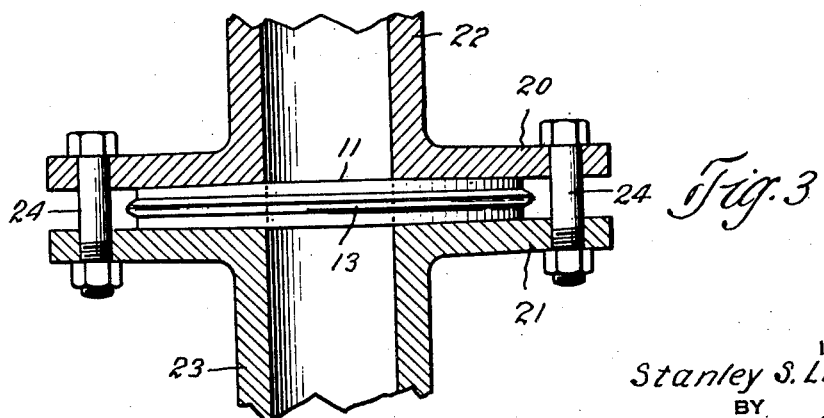
INVENTOR
Stanley S. Lippincott
BY
ATTORNEY Patented Dec. 28, 1948

2,457,694

UNITED STATES PATENT OFFICE 2,457,694

SPIRAL WOUND GASKET

Stanley S. Lippincott, Palmyra, N. J., assignor to Flexitallic Gasket Company, Camden, N. J., a corporation of New Jersey Application December 10, 1946, Serial No. 715,241

3 Claims. (Cl. 288—27)

This invention relates to spiral wound gaskets of the type shown in the Bohmer Patent No. 1,829,709 dated October 27, 1931, which comprise a longitudinally beaded metal strip spirally wound with a strip of compressive material between at least some of the successive metal convolutions, and has for an object to provide a gasket of the above type having improved sealing characteristics.

Another object is to provide a gasket of the above type which is particularly adapted for use where high sealing pressures are involved.

Another object is to provide a gasket which is particularly adapted for sealing the flanges of high pressure steam pipes or the like where the sealing flanges are highly stressed by the flange bolts.

Various other objects and advantages will be apparent as the nature of the invention is more fully disclosed.

In sealing high pressure pipe flanges it has been found that the most important sealing point for preventing leakage across the sealing surfaces is at the inner periphery of the gasket. If the fluid leaks past the inner periphery of the gasket it is extremely difficult to prevent the same from finally escaping to the outside and in the case of steam at extremely high pressures the steam may in certain instances form a channel across the face of the gasket or across the seating surfaces. This condition is aggravated by the fact that the stressing of the bolt flanges, which is required for obtaining high sealing pressures, produces bending moments of increasing magnitude as the outer periphery of such bolt flanges is approached, thus producing a lesser degree of flange face travel on the inner periphery of the gasket than on the outer periphery. The sealing efficiency is thus reduced at the point where it is of the most importance.

In order to overcome this disadvantage I propose to so wind the gasket that its stiffness is greater at the inner periphery than at the outer periphery, and preferably decreases uniformly from the inner to the outer peripheries. Hence, when the pipe flanges are stressed by the flange bolts, a wedge action is obtained, the gasket being more readily compressible at its outer periphery than at its inner periphery. The gasket may be so designed that, when compressed to a slight wedge shape by the flexing of the pipe flanges, a substantially uniform sealing pressure is obtained across the entire face of the gasket, or, if desired, the gasket may be so constructed that the sealing pressure remains greater at the inner periphery of the gasket than at the outer periphery thereof. In this way the sealing efficiency is increased for extremely high pressures and leakage across the sealing surfaces is effectively prevented.

Although the novel features which are believed to be characteristic of this invention are pointed out more particularly in the claims appended hereto, the nature of the invention will be better understood by referring to the following description, taken in connection with the accompanying drawing in which a specific embodiment thereof has been set forth for purposes of illustration.

In the drawing:

Fig. 1 is a fragmentary plan view of a circular spiral wound gasket embodying the present invention, with the thickness of the elements greatly exaggerated for clarity;

Fig. 2 is a section through the gasket taken on the line 2—2 of Fig. 1; and

Fig. 3 is a sectional view through two aligned sections of pipe showing the gasket in elevation, and with the flange bolts drawn up tightly to clamp the gasket between the pipe flanges.

Referring to the drawing more in detail the invention is shown as embodied in a spiral wound gasket composed of a metal strip 11 which is longitudinally grooved to form an internal groove 12 and an external bead 13 which provide resilience under the sealing pressure. The strip 11 is spiral wound with a strip 14 of compressive material such as asbestos, asbestos composition, a plastic material or a soft metal, interposed between certain successive convolutions of the strip 11. This gasket is of the general form disclosed in the Bohmer patent above identified and only so much thereof has been shown herein as is necessary to an understanding of the present invention.

In accordance with the present invention, I provide stiffening bands at spaced points along the radius of the gasket. These stiffening bands are composed of a plurality of metal-to-metal convolutions of the strip 11 between which the strip 14 of soft material is omitted. I preferably provide a plurality of such metal-to-metal convolutions at the inner periphery of the gasket forming a strengthening band 15. In the embodiment shown the strengthening band 15 comprises five metal-to-metal convolutions. I also provide strengthening bands 16 and 17 disposed between the inner and outer peripheries of the gasket which are progressively formed of fewer numbers of metal-to-metal convolutions. In the embodiment shown the strengthening band 16 is composed of four metal-to-metal convolutions and the strengthening band 17 of three metal-to-metal convolutions. At the outer periphery of the gasket a further strengthening band 18 is provided which in the form shown comprises two metal-to-metal convolutions.

It is to be noted that the strengthening bands 15, 16, 17 and 18 are respectively separated by distances indicated as $a$, $b$, and $c$ in Fig. 2 and that these distances become progressively greater from the inner periphery to the outer periphery of the gasket. Hence by the combined effect of the decreasing number of metal-to-metal convolutions in the strengthening bands as they progress from the inside to the outside of the gasket and of their progressively increased spacing, the gasket is made more highly resistant to compression forces at its inner periphery than at its outer periphery or, stated in another way, the stiffness of the gasket progressively decreases between its inner and outer peripheries. Of course this variation in stiffness may be obtained by uniformly spaced bands with decreasing numbers of convolutions, or by bands having the same number of different spacings, as desired.

It is to be understood of course that the particular number and arrangement of strengthening bands is illustrative only and may be varied as desired. The number of the strengthening bands may be increased and their relative spacing may be correspondingly decreased. In any event these bands are so designed that their stiffness decreases toward the outer periphery of the gasket. The convolutions of the bands may be secured together by welding or by the friction of the overlapped beads.

Referring to Fig. 3, a gasket of the above type is shown as disposed between pipe flanges 20 and 21 of pipes 22 and 23 which are to be sealed. The flanges 20 and 21 are shown as secured by flange bolts 24 which are arranged in a circle exterior to the gasket and in the embodiment shown, have been stressed to a degree such that the flanges 20 and 21 have been slightly flexed and the gasket has been compressed to a slight wedge shape. It is to be understood of course that in practice the flexing of the flanges 20 and 21 is extremely small and that the angle has been shown in Fig. 3 as greatly exaggerated for clarity.

Due to the stressing of the flanges 20 and 21 as above described, which causes the same to flex about the inner periphery of the gasket as a fulcrum, a high sealing pressure is maintained at the inner periphery and this pressure may be maintained across the entire face of the gasket or may progressively decrease toward the outer periphery of the gasket, depending upon the number and spacing of the strengthening bands.

By thus maintaining a high sealing pressure at the inner periphery of the gasket the steam or other fluid from the pipes 22 and 23 is prevented from leaking past the inner periphery of the gasket and thus setting up forces which would tend to separate the surfaces of the gasket from the contacting flanges 20 and 21 and thereby weaken the sealing action. Furthermore, the high pressure fluid is effectively stopped at the inner periphery of the gasket and thus prevented from following the spiral channel between the various convolutions of the metal strip 11. In the event that any fluid should leak past the first sealing band 15 and follow the spiral convolutions of the metal strip 11, it would be stopped at the second strengthening band 16 which effectively interrupts the spiral channel between the strips 11. This action is repeated at each strengthening band across the face of the gasket so that the cumulative effect thereof is utilized in preventing leakage.

Although a specific embodiment of the invention has been set forth for purposes of illustration, it is to be understood that the invention is capable of various uses and that changes and modifications may be made therein as will be readily apparent to a person skilled in the art. The invention is only to be restricted in accordance with the scope of the following claims.

What is claimed is:

1. A compressible gasket for sealing pipe flanges or the like having a bolt circle external to the gasket, comprising a metal strip of uniform width spirally wound with a strip of compressible material interposed between some of the metal convolutions, said strip of compressible material being interrupted to provide a plurality of stiffening bands spaced radially across said gasket, certain of said bands being located at the inner and outer peripheries of said gasket and others being disposed therebetween within the confines of the gasket, each band comprising a plurality of metal-to-metal convolutions of said metal strip, the number of metal-to-metal convolutions in the respective bands progressively decreasing from the inner to the outer peripheries of said gasket whereby the stiffness of the gasket progressively decreases from its inner to its outer peripheries.

2. A compressible gasket for sealing pipe flanges or the like having a bolt circle external to the gasket, comprising a metal strip of uniform width spirally wound with a strip of compressible material interposed between some of the metal convolutions, said strip of compressible material being interrupted to provide a plurality of stiffening bands spaced radially across said gasket, each band comprising a plurality of metal-to-metal convolutions of said metal strip, the number of metal-to-metal convolutions in the respective bands progressively decreasing from the inner to the outer peripheries of said gasket and the radial spacing between bands increasing from the inner to the outer peripheries of said gasket whereby the stiffness of the gasket progressively decreases from its inner to its outer peripheries.

3. A compressible gasket for sealing pipe flanges or the like having a bolt circle external to the gasket, comprising a metal strip of uniform width spirally wound with a strip of compressible material interposed between some of the metal convolutions, said strip of compressible material being interrupted to provide a plurality of stiffening bands spaced radially across said gasket, certain of said bands being located at the inner and outer peripheries of said gasket and a plurality of others being disposed therebetween within the confines of the gasket, each band comprising a plurality of metal-to-metal convolutions of said metal strip, the radial spacing between bands progressively increasing from the inner to the outer peripheries of said gasket whereby the stiffness of the gasket progressively decreases from its inner to its outer peripheries.

STANELY S. LIPPINCOTT.

REFERENCES CITED

The following references are of record in the file of this patent:

UNITED STATES PATENTS

| Number | Name | Date |
|---|---|---|
| 1,829,709 | Bohmer | Oct. 27, 1931 |
| 2,196,953 | Bohmer et al. | Apr. 9, 1940 |